United States Patent

Yamamoto et al.

(10) Patent No.: US 10,640,127 B2
(45) Date of Patent: May 5, 2020

(54) INFORMATION PROCESSING APPARATUS AND INFORMATION PROCESSING METHOD

(71) Applicant: DENSO TEN Limited, Kobe-shi, Hyogo (JP)

(72) Inventors: Chiharu Yamamoto, Kobe (JP); Osamu Kukimoto, Kobe (JP)

(73) Assignee: DENSO TEN Limited, Kobe-shi (JP)

( * ) Notice: Subject to any disclaimer, the term of this patent is extended or adjusted under 35 U.S.C. 154(b) by 0 days.

(21) Appl. No.: 16/233,478

(22) Filed: Dec. 27, 2018

(65) Prior Publication Data

US 2019/0241196 A1 Aug. 8, 2019

(30) Foreign Application Priority Data

Feb. 6, 2018 (JP) ................................. 2018-019520

(51) Int. Cl.
*B60W 50/14* (2020.01)
*B60W 50/08* (2020.01)

(52) U.S. Cl.
CPC .......... *B60W 50/14* (2013.01); *B60W 50/082* (2013.01); *B60W 2050/143* (2013.01); *B60W 2050/146* (2013.01)

(58) Field of Classification Search
None
See application file for complete search history.

(56) References Cited

U.S. PATENT DOCUMENTS

2016/0311323 A1* 10/2016 Lee .................. B60K 37/06
2016/0347250 A1* 12/2016 Enz .................... B60R 1/00

FOREIGN PATENT DOCUMENTS

JP 2007-145137 A 6/2007

* cited by examiner

*Primary Examiner* — Thomas S McCormack
(74) *Attorney, Agent, or Firm* — Oliff PLC

(57) ABSTRACT

An information processing apparatus according to an embodiment includes an adjusting unit and a driving-situation detecting unit. The adjusting unit executes an adjustment on pieces of notification information in accordance with priorities. The driving-situation detecting unit acquires drive controlling information. The drive controlling information is information for identifying whether driving control of a moving body is manual driving or autonomous driving. The adjusting unit executes the adjustment in accordance with the priorities that are different depending on the drive controlling information acquired by the driving-situation detecting unit.

11 Claims, 5 Drawing Sheets

FIG.3

| INFORMATION TYPE | INFORMATION CONTENTS | PRIORITY | |
| --- | --- | --- | --- |
| | | MANUAL DRIVING | AUTONOMOUS DRIVING |
| TRAVELLING SAFETY | NEAR-ACCIDENT NOTIFICATION | 10 | 10 |
| | DENT NOTIFICATION | 15 | 15 |
| | ... | ... | ... |
| TRAVELLING ASSIST | TRAFFIC JAM NOTIFICATION | 35 | 35 |
| | LOCALIZED TORRENTIAL RAIN NOTIFICATION | 50 | 45 |
| | ... | ... | ... |
| ENTERTAINMENT | RECOMMENDED STORE INFORMATION | 70 | 45 |
| | RECOMMENDED MUSICAL COMPOSITION INFORMATION | 80 | 50 |
| | ... | ... | ... |

INFORMATION PROCESSING APPARATUS AND INFORMATION PROCESSING METHOD

CROSS-REFERENCE TO RELATED APPLICATION

This application is based upon and claims the benefit of priority of the prior Japanese Patent Application No. 2018-019520, filed on Feb. 6, 2018, the entire contents of which are incorporated herein by reference.

FIELD

The embodiment discussed herein is directed to an information processing apparatus and an information processing method.

BACKGROUND

Conventionally, there have been increased on-vehicle external devices that output notification information for informing a vehicle occupant of various kinds of information. Thus, there has been proposed an information processing apparatus that previously assigns priorities to pieces of notification information, for example, when notification timings of a plurality of pieces of the notification information output from a plurality of external devices are overlapped with each other, adjusts which of the pieces of the notification information is preferentially reported on the basis of the priorities (see Japanese Laid-open Patent Publication No. 2007-145137, for example).

However, the conventional technology has room for improvement in informing a vehicle occupant of a piece of notification information in an appropriate priority. For example, during autonomous driving for automatically controlling driving operations, it is preferable that information on entertainment of an occupant is prior to information on the driving operations. On the other hand, during manual driving, it is preferable that information on the driving operations is prior to information on entertainment of the occupant so that a driver is able to more concentrate on his/her driving.

SUMMARY

An information processing apparatus according to an embodiment includes an adjusting unit and a driving-situation detecting unit. The adjusting unit executes an adjustment on pieces of notification information in accordance with priorities. The driving-situation detecting unit acquires drive controlling information. The drive controlling information is information for identifying whether driving control of a moving body is manual driving or autonomous driving. The adjusting unit executes the adjustment in accordance with the priorities that are different depending on the drive controlling information acquired by the driving-situation detecting unit.

BRIEF DESCRIPTION OF DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF EMBODIMENTS

Hereinafter, an embodiment of an information processing apparatus and an information processing method according to the present application will be described in detail with reference to the accompanying drawings. The present disclosure is not limited to the embodiment described in the following. Hereinafter, a case will be exemplified in which a moving body is a vehicle; however, the moving body may be another kind of moving body such as a bicycle, a motorcycle, and a ship.

Figure 1:
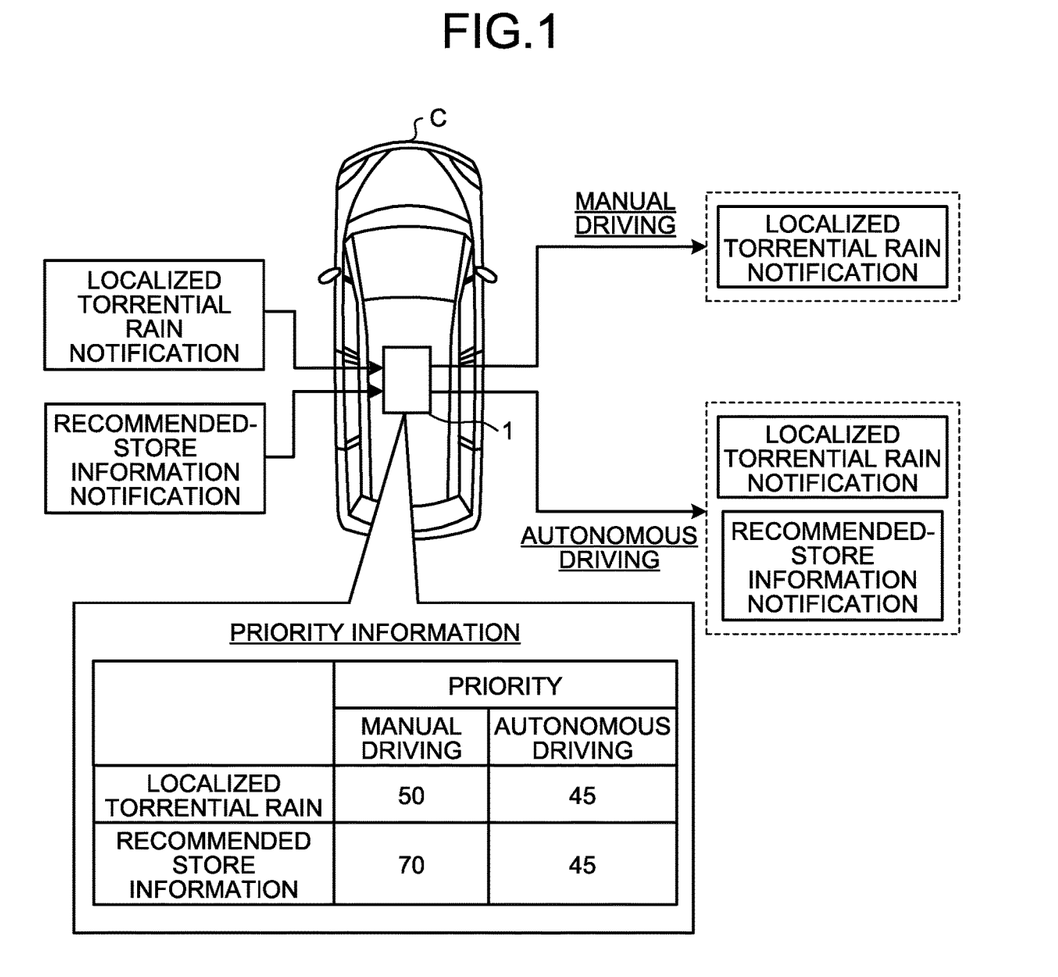
FIG. 1 is a diagram illustrating the outline of an information processing method according to an embodiment.

First, the outline of the information processing method according to the embodiment will be explained with reference to FIG. 1. FIG. 1 is a diagram illustrating the outline of the information processing method according to the embodiment. In FIG. 1, assume that an information processing apparatus 1 according to the embodiment is provided in a vehicle C so as to perform the information processing method according to the embodiment. The vehicle C travels under any one driving control of autonomous driving and manual driving. The autonomous driving is driving control for automatically controlling all or a part of driving operations of a driver. The manual driving is driving control in which a driver manually performs all of the driving operations.

In FIG. 1, assume that the information processing apparatus 1 receives, as notification information to be reported to an occupant of the vehicle C, "localized torrential rain notification" and "recommended-store information notification". As illustrated in FIG. 1, a priority (one example of first priority) for manual driving and a priority (one example of second priority) for autonomous driving are set for each of pieces of the notification information.

These priorities are indexes that become reference in executing a process for adjusting which piece of the notification information is preferentially reported when pieces of the notification information compete with each other, for example, when notification timings of a plurality of pieces of the notification information are overlapped with each other. In the example illustrated in FIG. 1, it is indicated that a priority is higher as a value of the priority illustrated in FIG. 1 is lower. In other words, it is indicated that a priority "50" has a higher priority than a priority "70".

Herein, a conventional information processing apparatus will be explained. In the conventional information processing apparatus, each one-type priority is assigned to a corresponding piece of notification information, and which piece of the notification information is to be preferentially reported is adjusted on the basis of the priority. In other words, the adjustment is performed on the basis of the priority that is always fixed regardless of a situation of a vehicle.

Thus, for example, when notification timings of "localized torrential rain notification" and "recommended-store information notification" are overlapped with each other, "localized torrential rain notification" is always preferentially reported whether the driving control is autonomous driving or manual driving.

However, for example, in a case of the autonomous driving, because a driver need not concentrate on his/her driving operation, there presents no trouble even when the driver is informed of information on entertainment such as "recommended-store information notification", moreover, the satisfaction of the driver is improved by the notification of such entertainment information. On the other hand, in a case of the manual driving, because the driver has to concentrate on his/her driving operation, information having no relation to the driving operation, such as the entertainment information, may be a factor that disturbs the driver's concentration in driving even when the driver is not interested therein. Thus, the conventional information processing apparatus has room for improvement in informing a vehicle occupant of notification information in an appropriate priority.

Thus, the information processing apparatus 1 according to the embodiment is configure to perform an adjustment by using different priorities depending on driving control of the vehicle C. For example, the information processing apparatus 1 according to the embodiment switches between and properly use a first priority corresponding to the manual driving and a second priority corresponding to the autonomous driving. Specifically, when detecting a switch from one to the other driving control, the information processing apparatus 1 according to the embodiment adjusts the notification information on the basis of a priority corresponding to the switched-into driving control.

For example, in the example illustrated in FIG. 1, assume that a switch from the manual driving into the autonomous driving is detected. In this case, the information processing apparatus 1 according to the embodiment switches the priority of notification information to be used in the adjustment from "manual driving" into "autonomous driving". In other words, regarding "localized torrential rain notification", a priority "50" is changed into a priority "45", and regarding "recommended-store information notification", a priority "70" is changed into a priority "45". The information processing apparatus 1 performs the adjustment on the basis of the priority of the "autonomous driving". Thus, notification information including both of the "localized torrential rain notification" and the "recommended-store information notification" are reported.

For example, assume that a switch from the autonomous driving into the manual driving is detected. In this case, the information processing apparatus 1 according to the embodiment switches the priority of notification information from "autonomous driving" into "manual driving". In other words, regarding "localized torrential rain notification", a priority "45" is changed into a priority "50", and regarding "recommended-store information notification", a priority "45" is changed into a priority "70". The information processing apparatus 1 performs an adjustment on the basis of the priority of the "manual driving". Thus, only the "localized torrential rain notification" is reported.

In other words, in the example illustrated in FIG. 1, a driver is able to be informed of the entertainment information, such as "recommended-store information notification", only during the autonomous driving in which the driver comparatively has leeway in driving, on the other hand, "recommended-store information notification" is not reported during the manual driving in which the driver has to concentrate on his/her driving. Thus, by employing the information processing method according to the embodiment, it is possible to inform an occupant in the vehicle C of notification information in an appropriate priority.

In the example illustrated in FIG. 1, the case is exemplified in which the priority for manual driving and the priority for autonomous driving are previously assigned to the notification information, not limited thereto, for example, any one of the priority for manual driving and the priority for autonomous driving may be previously assigned to the notification information, and this priority may be multiplied by a factor in accordance with a driving control.

Figure 2:
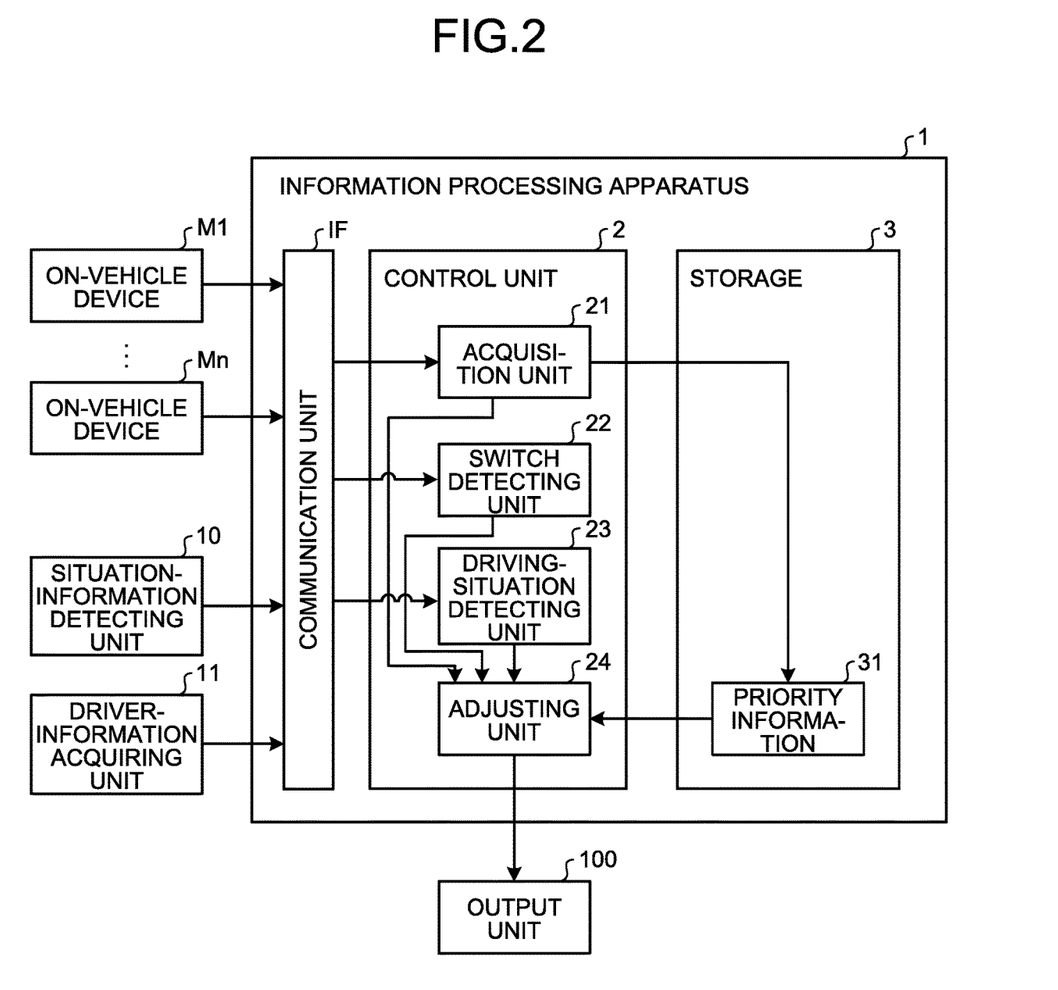
FIG. 2 is a block diagram illustrating a configuration of an information processing apparatus according to the embodiment.

Next, details of a configuration of the information processing apparatus 1 according to the embodiment will be explained with reference to FIG. 2. FIG. 2 is a block diagram illustrating the configuration of the information processing apparatus 1 according to the embodiment. As illustrated in FIG. 2, the information processing apparatus 1 according to the embodiment is connected to a plurality of on-vehicle devices M1 to Mn, a situation-information detecting unit 10, a driver-information acquiring unit 11, and an output unit 100.

The plurality of on-vehicle devices M1 to Mn is external devices that are provided in the vehicle C so as to transmit notification information to the information processing apparatus 1. The on-vehicle devices M1 to Mn include, for example, a car navigation device, an audio device, a television device, a driver assistance device, a vehicle-to-vehicle communication device, a road-to-vehicle communication device, a traffic information receiver, a smartphone, and a portable terminal. Each of the on-vehicle devices M1 to Mn outputs a corresponding piece of the notification information to the information processing apparatus 1. Hereinafter, the plurality of on-vehicle devices M1 to Mn may be collectively referred to as the on-vehicle devices M.

Notification information to be output from the on-vehicle device M may be notification information (may be referred to as PUSH-type) for reporting a near-accident spot by interruption, or may be notification information (may be referred to as PULL-type) generated by a user operation such as a navigation operation and video browsing.

The situation-information detecting unit 10 detects, by using, a camera, various sensors, etc., situation information on a situation of the vehicle C so as to output the detected situation information to the information processing apparatus 1. The situation information may include information on states (autonomous driving or manual driving) of driving operations such as gas-pedal, brake, and steering-wheel operations; and information on an object existing in the vicinity of the vehicle C, a present location, a traveling velocity, an in-vehicle situation (number of occupants and/or states of occupants) of the vehicle C. In addition thereto, the situation information may include information on an output situation of notification information in the output unit 100. Specifically, The situation information may include information on, for example, whether or not the notification information is in being output, and/or a reproducing position of notification information such as a musical composition.

The driver-information acquiring unit 11 detects, by using an in-vehicle camera, various sensors, etc., a state of a driver of the vehicle C. The state of the driver includes biological information such as a gaze direction, margin of driving, and a body temperature.

The output unit 100 may be constituted of a display including, for example, a center display of an on-vehicle navigation and the like, a head-up display (HUD) arranged on a windscreen of the vehicle C, a meter display that is arranged in an instrument panel including meters and the like; a sound outputting device such as a speaker; an illuminating device; etc. In FIG. 2, the output unit 100 whose number is one is illustrated; however, the number of the output units 100 may be two or more.

The information processing apparatus 1 according to the embodiment includes a communication unit IF, a control unit 2, and a storage 3. The communication unit IF includes a communication interface that transmits and receives information to or from each of the on-vehicle devices M, the situation-information detecting unit 10, the driver-information acquiring unit 11, and the output unit 100.

The control unit 2 includes an acquisition unit 21, a switch detecting unit 22, a driving-situation detecting unit 23, and an adjusting unit 24. The storage 3 stores therein priority information 31.

The information processing apparatus 1 includes a computer that includes a Central Processing Unit (CPU), a Random Access Memory (RAM), a Hard Disk Drive (HDD), an input/output port; various circuits; and the like.

The CPU of the computer reads out and executes a program stored in the ROM so as to function as the acquisition unit 21, the switch detecting unit 22, the driving-situation detecting unit 23, and the adjusting unit 24 of the control unit 2.

All or a part of the acquisition unit 21, the switch detecting unit 22, the driving-situation detecting unit 23, and the adjusting unit 24 of the control unit 2 may be constituted of hardware such as an Application Specific Integrated Circuit (ASIC) and a Field Programmable Gate Array (FPGA).

The storage 3 corresponds to an RAM and/or an HDD, for example. Any of the RAM and the HDD stores therein the priority information 31, information on various programs, and the like. The information processing apparatus 1 may acquire the above-mentioned programs and various kinds of information via another computer connected by using a wired or wireless network, or a portable recording medium.

The control unit 2 acquires priority information, which is included in the notification information, when detecting a switch between the driving controls of the vehicle C, performs the adjustment on the basis of the priority corresponding to the switched-into driving control of the priority information.

The acquisition unit 21 acquires the priority information 31 including a first priority corresponding to the manual driving of the driving controls of the vehicle C and a second priority corresponding to the autonomous driving of the driving controls of the vehicle C. The priority information 31 to be acquired by the acquisition unit 21 may be acquired from the priority information 31 that is previously generated to be stored in the storage 3, or may acquire notification information to which the priority information 31 including the first priority and the second priority is provided by the on-vehicle device M, when the on-vehicle device M outputs the notification information. In this case, each of the on-vehicle devices M is previously provided with common software according to the spec of the information processing apparatus 1, and provides a first priority and a second priority to notification information via this software. Details of the priority information 31 will be mentioned later with reference to FIG. 3.

The switch detecting unit 22 detects a timing (switch execution timing) at which a switch between the manual driving and the autonomous driving of the driving control is executed. For example, the switch detecting unit 22 detects a switching instruction that instructs a switch execution timing from one to the other driving control of the driving controls of the vehicle C. Specifically, the switch detecting unit 22 detects a switching instruction from the manual driving into the autonomous driving, or a switching instruction from the autonomous driving into the manual driving.

The switch between the driving controls may be automatically executed, or may be performed by a manual operation (for example, depression of dedicated button) of a driver. In a case of automatically switching between the driving controls, for example, when switching into the manual driving in traveling on a general road or in an urban area, the switch detecting unit 22 detects a switching instruction of the driving control that is caused by moving of a present location of the vehicle C into the general road or the urban area, which is transmitted from the situation-information detecting unit 10. The driving control is switched from the autonomous driving into the manual driving after a predetermined time interval (for example, seven seconds) taking into consideration a time interval needed for a process for switching from the autonomous driving into the manual driving has elapsed. When automatically switching into the autonomous driving in entering an expressway, a switching instruction of the driving control is detected by traveling into the expressway. The driving control is switched from the manual driving into the autonomous driving after a time interval needed for the switching process or a predetermined time interval (for example, five seconds) has elapsed since the detection. More specifically, the switch detecting unit 22 may detect that the vehicle C passes through a tollgate by using an Electronic Toll Collection (ETC) and the like, so as to detect a switching instruction of the driving control. Regarding a manual switching, depression of a dedicated button may be detected as a switching instruction, for example.

Figure 4:
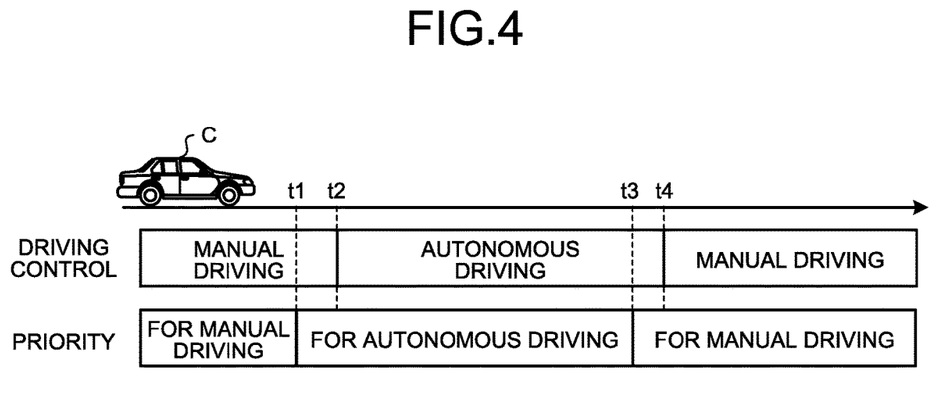
FIG. 4 is a diagram illustrating timings for switching priorities executed by an adjusting unit.

When automatically switching between the driving controls, it is preferable that a switch of the priority may be performed prior to the switch between the driving controls, this point may be mentioned later with reference to FIG. 4.

The driving-situation detecting unit 23 detects situation information on a situation of the vehicle C. For example, the driving-situation detecting unit 23 acquires situation information on a situation of the driving control detected by the situation-information detecting unit 10. Specifically, the driving-situation detecting unit 23 acquires drive controlling information by using which whether the driving control of the vehicle C is the manual driving or the autonomous driving is able to be identified.

The adjusting unit 24 executes an adjustment in accordance with different priorities depending on the driving control detected by the driving-situation detecting unit 23 from the priority information 31 acquired by the acquisition unit 21.

For example, when notification timings of a plurality of pieces of notification information received from the on-vehicle devices M are overlapped with each other, the adjusting unit 24 adjusts the priority among the plurality of pieces of notification information. In this case, the adjusting unit 24 may decide, by the adjustment, one piece of notification information to be reported among from the pieces of notification information, or may decide by the adjustment a notification order of the pieces of notification information.

When receiving a second notification information during a time interval in which the output unit 100 is outputting a first notification information, the adjusting unit 24 may adjust whether to continuously output the first notification information or to interrupt the first notification information so as to output the second notification information instead of the first notification information.

When receiving predetermined notification information in a state where nothing is output from the output unit 100, the adjusting unit 24 may adjust whether or not the output unit 100 is caused to output this notification information.

Figure 3:
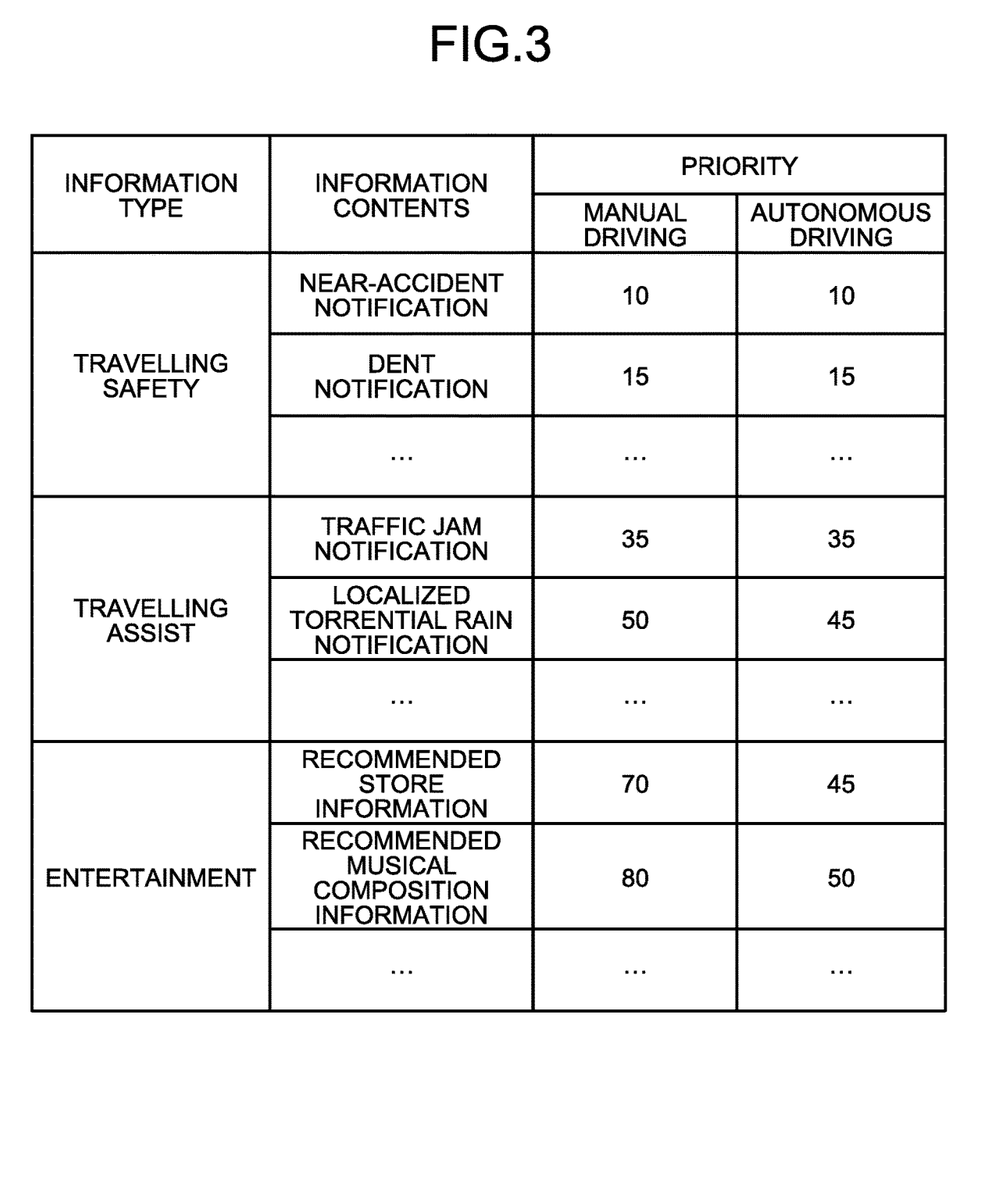
FIG. 3 is a diagram illustrating priority information.

The priority information 31 will be explained with reference to FIG. 3. FIG. 3 is a diagram illustrating the priority information 31. As illustrated in FIG. 3, the priority information 31 includes items such as "information type", "information contents", and "priority".

The "information type" is information that indicates a type of the notification information. For example, the "travelling safety" is traveling information (one example of movement information) on the safety when the vehicle C is travelling, the "travelling assist" is assist information for assisting a driving operation when the vehicle C is travelling, and the "entertainment" is entertainment information on entertainment of an occupant.

The "information contents" is information that indicates notification contents included in the notification information so as to indicate notification contents to be reported to an occupant of the vehicle C. The "priority" is information that indicates a priority set for each piece of the notification information. The "priority" includes "manual driving" and "autonomous driving".

Specifically, in "near-accident notification" of the example illustrated in FIG. 3, a priority of the manual driving is "10", and a priority of the autonomous driving is "10". In other words, regarding traveling information of the "near-accident notification" and the like, the acquisition unit 21 acquires the priority information 31 in which both of the "manual driving" being the first priority and the "autonomous driving" being the second priority have the same priority.

Thus, for example, the traveling information on travelling safety is able to be reported in the same priority as that of the manual driving even during the autonomous driving, it is possible to inform a driver of the traveling information on travelling safety in an appropriate priority while improving the safety of a driver.

Moreover, in the "travelling assist" of the example illustrated in FIG. 3, the same priority is set for the "manual driving" and the "autonomous driving" of "traffic jam notification", and a higher priority is set for the "autonomous driving" than the "manual driving" of "localized torrential rain notification".

In other words, a priority of notification information on a rapid environment change that occurs in the vicinity of the vehicle C, such as a "localized torrential rain notification", is increased in a case of the autonomous driving, so that it is possible to preferentially inform a driver of the rapid environment change.

Moreover, in the example illustrated in FIG. 3, all priorities of the "autonomous driving" are set to be higher than those of "manual driving" in the notification information of "entertainment". In other words, regarding the entertainment information of "entertainment" and the like, the acquisition unit 21 acquires the priority information 31 in which the "autonomous driving" being a second priority is higher than the "manual driving" being a first priority. Thus, it is possible to improve the satisfaction of an occupant during the autonomous driving by preferentially reporting the entertainment information because a driver need not perform a driving operation during the autonomous driving.

In FIG. 3, the priorities of all pieces of notification information of "entertainment" in the "autonomous driving" are set to be higher than those of the "manual driving", for example, a priority of a part of pieces of the notification information in the "autonomous driving", which is selected by a user operation of a driver and the like among from the pieces of the notification information of the "entertainment", may be set higher.

In the example illustrated in FIG. 3, in the "travelling assist" and "entertainment", the case is exemplified in which the priority of "autonomous driving" is higher than the priority of "manual driving"; however, the priority of "autonomous driving" may be set lower than the priority of "manual driving".

Next, timings for switching priorities to be executed by the adjusting unit 24 will be explained with reference to FIG. 4. FIG. 4 is a diagram illustrating timings (hereinafter, may be referred to as priority switch timing) for switching priorities executed by the adjusting unit 24. In FIG. 4, at a time point t1, the switch detecting unit 22 detects a switching instruction of the driving control from the manual driving into the autonomous driving, and the driving control is actually switched into the autonomous driving at a time point t2. At a time point t3, the switch detecting unit 22 detects a switching instruction of the driving control for switching from the autonomous driving into the manual driving, and the driving control is actually switched into the manual driving at a time point t4.

The adjusting unit 24 makes a switch execution timing, at which a switch caused by a switching instruction detected by the switch detecting unit 22 is actually executed, and a priority switch timing into the priority corresponding to the driving control different from each other. Specifically, as illustrated in FIG. 4, at the time point t1 when the switch detecting unit 22 detects a switching instruction of the driving control, the adjusting unit 24 switches the driving control from the priority for manual driving ("manual driving" illustrated in FIG. 3) into the priority for autonomous driving ("autonomous driving" illustrated in FIG. 3). In other words, the switch of the priority is executed at the time point t1 that is prior to the time point t2 being a switch execution timing of the driving control.

In other words, the adjusting unit 24 switches the priority into the priority for autonomous driving at a time point a predetermined time interval (time interval from time point t1 to time point t2) before a time point at which the switch of the driving control is actually executed. Thus, the switching of the priority is executed before the switching of the driving control, so that it is possible to reduce confusion of a driver that is caused by the switching of the priority.

Similarly, at the time point t3, the adjusting unit 24 switches the priority from the priority for autonomous driving into the priority for manual driving. In other words, the adjusting unit 24 switches the priority into the priority for manual driving at a time point a predetermined time interval (time interval from time point t3 to time point t4) before a time point at which the switch of the driving control is actually executed.

It is preferable that the adjusting unit 24 informs, at priority switch timings of the time point t1 and the time point t3, a driver that the priority is switched. Thus, it is possible to cause a driver to reliably recognize that the priority of the notification information has been switched before the driving control is switched, to be able to further reduce confusion of the driver.

As the switch of information outputting in the output unit 100, a method that is using as a trigger the next information outputting request transmitted from the on-vehicle device Mn (priority is switched by switching of driving control;

however, screen and the like are actually switched when new information outputting request is transmitted), and a method that is using as a trigger switching of the driving control (priority is switched by switching of driving control; and adjustment is immediately executed in accordance with this switched priority so as to further switch screen and the like), when a user is able to select one among from these two methods and set the selected one, it is possible to realize screen switching according to the driving control, which is suitable for the taste of the user.

Figure 5:
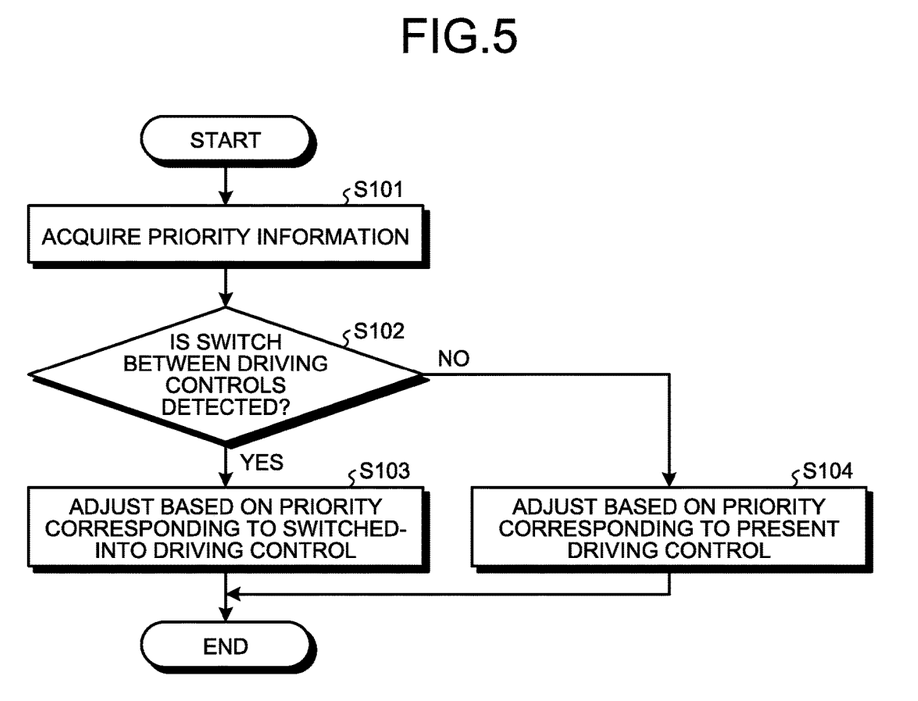
FIG. 5 is a flowchart illustrating a processing procedure to be executed by the information processing apparatus according to the embodiment.

Next, a processing procedure to be executed by the information processing apparatus 1 according to the embodiment will be explained with reference to FIG. 5. FIG. 5 is a flowchart illustrating the processing procedure to be executed by the information processing apparatus 1 according to the embodiment.

As illustrated in FIG. 5, the acquisition unit 21 acquires the priority information 31 that includes a first priority corresponding to the manual driving and a second priority corresponding to the autonomous driving of the driving controls of the vehicle C (Step S101).

Next, the switch detecting unit 22 determines whether or not detecting a switch between one to the other driving control (Step S102).

When the switch detecting unit 22 detects the switching between the driving controls (Step S102: Yes), the adjusting unit 24 executes an adjustment on the basis of the priority corresponding to the driving control detected by the switch detecting unit 22 of the priority information 31 acquired by the acquisition unit 21 (Step S103), and ends the processing.

On the other hand, when the switch detecting unit 22 does not detect the switching between the driving controls (Step S102: No), the adjusting unit 24 executes an adjustment on the basis of the priority corresponding to the present driving control (Step S104), and ends the processing.

As described above, the information processing apparatus 1 according to the embodiment includes the adjusting unit 24 and the driving-situation detecting unit 23. The adjusting unit 24 executes an adjustment on pieces of notification information in accordance with priorities. The driving-situation detecting unit 23 acquires drive controlling information. The drive controlling information is information for identifying whether driving control of a moving body (for example, vehicle C) is manual driving or autonomous driving. The adjusting unit 24 executes the adjustment in accordance with the priorities that are different depending on the drive controlling information acquired by the driving-situation detecting unit 23. Thus, a priority that is different between the autonomous driving and the manual driving is able to be set, so that it is possible to inform an occupant in the vehicle C of notification information in an appropriate priority.

In the above-mentioned embodiment, the priority information 31 includes both of priorities of "manual driving" and "autonomous driving"; however, the priority information 31 may include only a priority (second priority) of "autonomous driving".

In this case, the acquisition unit 21 receives notification information to which a priority (first priority) of "manual driving" is previously assigned by the on-vehicle device M. When assigning the first priorities to the on-vehicle devices M, each of the on-vehicle devices M is previously provided with common software according to the spec of the information processing apparatus 1, the first priorities are set via this software, and then the first priorities are transmitted to the information processing apparatus 1.

In the above-mentioned embodiment, the adjusting unit 24 switches between the priorities at a timing (time point t1 and time point t3 illustrated in FIG. 4) when the switch detecting unit 22 detects a switching instruction; however, a priority switch timing may differ depending on a situation of the vehicle C, for example. This point will be mentioned with reference to FIG. 6.

Figure 6:
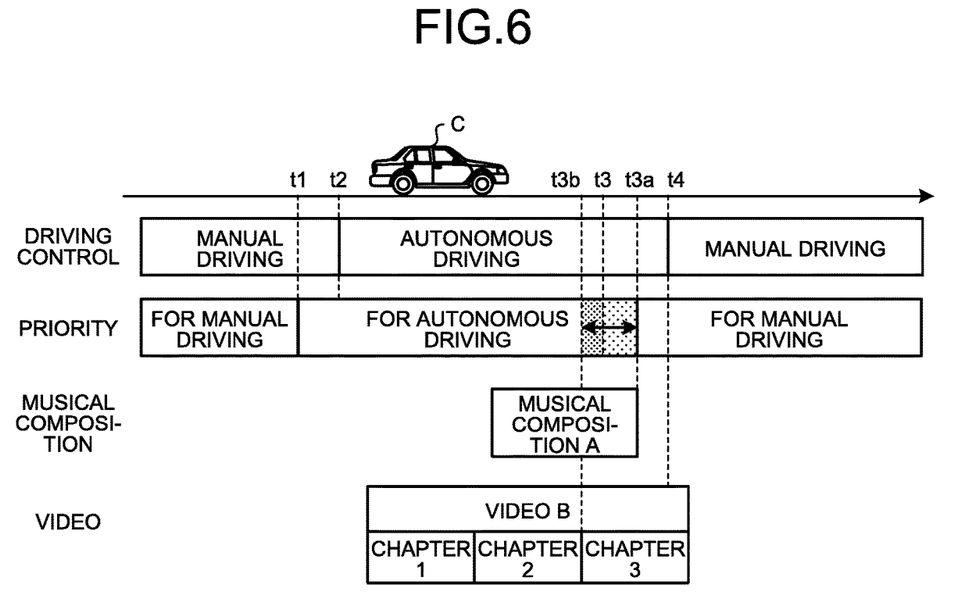
FIG. 6 is a diagram illustrating priority switch timings of an adjusting unit according to a modification.

FIG. 6 is a diagram illustrating priority switch timings of the adjusting unit 24 according to a modification. In FIG. 6, a "musical composition A", which is entertainment information, is reproduced until a time point t3a via the time point t3. For example, the situation-information detecting unit 10 is able to acquire, as the situation information, the information indicating that the "musical composition A" is to be reproduced until the time point t3a. In FIG. 6, assume that reproduction of a "video B", divided into chapters 1 to 3, is stopped at a time point t3b of the chapter 2. Similarly to the aforementioned, information indicating that the "video B" is to be reproduced until the time point t3b is able to be acquired as the situation information.

The adjusting unit 24 decides a priority switch timing on the basis of the situation information detected by the driving-situation detecting unit 23. As illustrated in FIG. 6, when the situation-information detecting unit 10 detects the situation information indicating that the "musical composition A" is to be reproduced until the time point t3a, the adjusting unit 24 delays a priority switch timing from the priority for autonomous driving into the priority for manual driving, not to the time point t3 but to the time point t3a. Thus, an occupant of the vehicle C listens to the end of the "musical composition A" and then the priority is switched, so that it is possible to improve the satisfaction of a driver. In a case of the "video B", the adjusting unit 24 expedites to the time point t3b at which the chapter 2 of the "video B" ends. Thus, the video is able to be stopped at a good stopping point (chapter end, beginning of commercial message, etc.), when the "video B" is to be subsequently reproduced thereafter, it becomes easy to watch, so that it is possible to improve the satisfaction of the driver, for example.

In FIG. 6, the time point t3 at which the autonomous driving is switched into the manual driving is exemplified; however, it is needless to say that the same is true of the time point t1 at which the autonomous driving is switched into the manual driving. In other words, in a case where the switching from the manual driving into the autonomous driving is detected, an interruption of information having no relation to driving operations while predetermined notification information is being reported, such as the entertainment information, is able to be prevented, so that it is possible to reduce confusion of the driver.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
   an adjusting unit that executes an adjustment on pieces of notification information in accordance with priorities; and
   a driving-situation detecting unit that acquires drive controlling information, the drive controlling information being information for identifying whether driving control of a moving body is manual driving or autonomous driving, wherein when notification timings of the plurality of pieces of notification information are overlapped with each other, the adjusting unit executes the adjustment that decides a notification order of the pieces of notification information, in accordance with the priorities that are different depending on the drive controlling information acquired by the driving-situation detecting unit.

2. The information processing apparatus according to claim 1, wherein the notification information includes movement information on safety when the moving body travels, and priorities of a first priority of the manual driving and a second priority of the autonomous driving of the movement information are higher than priorities of other notification information.

3. The information processing apparatus according to claim 1, wherein the notification information includes entertainment information on entertainment of an occupant in the moving body, and a second priority of the autonomous driving is higher than a first priority of the manual driving in the entertainment information.

4. The information processing apparatus according to claim 1, wherein a switch timing of the driving control is made different from a switch timing of the priority into a priority that is corresponding to the driving control.

5. The information processing apparatus according to claim 4, wherein the priority switch timing is decided based on situation information on a situation of the moving body.

6. An information processing method performed by a computer provided in a moving body, the method comprising:

executing an adjustment on pieces of notification information in accordance with priorities; and acquiring drive controlling information, the drive controlling information being information for identifying whether driving control of a moving body is manual driving or autonomous driving, wherein the executing includes:

when notification timings of the plurality of pieces of notification information are overlapped with each other, executing the adjustment that decides a notification order of the pieces of notification information, in accordance with the priorities that are different depending on the drive controlling information acquired in the acquiring.

7. An information processing apparatus comprising:

an adjusting unit that executes an adjustment on pieces of notification information in accordance with priorities; and a driving-situation detecting unit that acquires drive controlling information, the drive controlling information being information for identifying whether driving control of a moving body is manual driving or autonomous driving, wherein the adjusting unit executes the adjustment in accordance with the priorities that are different depending on the drive controlling information acquired by the driving-situation detecting unit, and a switch timing of the driving control is made different from a switch timing of the priority into a priority that is corresponding to the driving control.

8. The information processing apparatus according to claim 7, wherein the notification information includes movement information on safety when the moving body travels, and priorities of a first priority of the manual driving and a second priority of the autonomous driving of the movement information are higher than priorities of other notification information.

9. The information processing apparatus according to claim 7, wherein the notification information includes entertainment information on entertainment of an occupant in the moving body, and a second priority of the autonomous driving is higher than a first priority of the manual driving in the entertainment information.

10. The information processing apparatus according to claim 7, wherein the priority switch timing is decided based on situation information on a situation of the moving body.

11. An information processing method performed by a computer provided in a moving body, the method comprising:

executing an adjustment on pieces of notification information in accordance with priorities; and acquiring drive controlling information, the drive controlling information being information for identifying whether driving control of a moving body is manual driving or autonomous driving, wherein the executing includes:

executing the adjustment in accordance with the priorities that are different depending on the drive controlling information acquired in the acquiring, and a switch timing of the driving control is made different from a switch timing of the priority into a priority that is corresponding to the driving control.

* * * * *